(12) United States Patent
Jin

(10) Patent No.: US 8,059,603 B2
(45) Date of Patent: Nov. 15, 2011

(54) METHOD FOR HANDOVER USING RELAY STATION

(75) Inventor: Yong Suk Jin, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 600 days.

(21) Appl. No.: 12/159,585

(22) PCT Filed: Jan. 2, 2007

(86) PCT No.: PCT/KR2007/000008
§ 371 (c)(1),
(2), (4) Date: Oct. 22, 2008

(87) PCT Pub. No.: WO2007/078138
PCT Pub. Date: Jul. 12, 2007

(65) Prior Publication Data
US 2009/0097449 A1 Apr. 16, 2009

(30) Foreign Application Priority Data
Jan. 2, 2006 (KR) .................. 10-2006-0000274

(51) Int. Cl.
*H04W 4/00* (2009.01)
(52) U.S. Cl. .................. 370/331; 370/330; 455/436
(58) Field of Classification Search .................. 455/436, 455/437, 438, 442, 443; 370/329, 330, 331, 370/332, 334, 315
See application file for complete search history.

(56) References Cited

U.S. PATENT DOCUMENTS

| 2005/0117539 A1* | 6/2005 | Song et al. ............ 370/328 |
| 2005/0197121 A1 | 9/2005 | Fujiwara et al. |
| 2007/0097945 A1* | 5/2007 | Wang et al. ............ 370/349 |
| 2009/0262705 A1* | 10/2009 | Kim et al. ............ 370/331 |

FOREIGN PATENT DOCUMENTS

| GB | 2390782 A | 1/2004 |
| JP | 6244780 A | 9/1994 |
| WO | WO 97/42779 A1 | 11/1997 |

OTHER PUBLICATIONS

Sungkyung K., et al.: "Group Handover on the Mobile RS" IEEE 802.16 Broadband Wireless Access Working Group, IEEE C802.16j-06/227r1.pdf [online], Nov. 13, 2006.

* cited by examiner

*Primary Examiner* — Huy Vu
*Assistant Examiner* — Dady Chery
(74) *Attorney, Agent, or Firm* — Lee, Hong, Degerman, Kang & Waimey

(57) ABSTRACT

A method for controlling handover using a Relay Station (RS) whose coverage includes at least one mobile station is provided. In the method, the RS monitors an uplink band allocated to a mobile station and obtains a Connection ID (CID) and a Medium Access Control (MAC) address the mobile station. The RS transmits a scanning request message including the MAC address of the mobile station to a base station. The RS then receives a scanning response message including scanning timing and scanning interval information from the base station and scans neighbor base stations using the information included in the scanning response message. This method more efficiently performs handover of mobile stations in the RS coverage.

6 Claims, 11 Drawing Sheets

METHOD FOR HANDOVER USING RELAY STATION

TECHNICAL FIELD

The present invention relates to a handover control method in a communication system including a relay station (RS), and more particularly, to a method that allows efficient handover of mobile stations present in the coverage of a mobile RS.

BACKGROUND ART

Since non-line-of-sight (or indirect wave) communication may undergo serious multipath fading, an Automatic Repeat Request (ARQ) scheme is generally provided in a Medium Access Control (MAC) layer to achieve reliability of the communication. Advanced Antenna System (AAS) technologies are also provided to increase the cell coverage and the capacity of the system through beam forming using multiple antennas. The system may also support a Dynamic Frequency Selection (DFS) function to overcome coexistence problems with other systems in unlicensed bands.

FIG. 1 illustrates an example of a mesh-structured communication network. Generally, in broadband wireless access, it is possible to perform communication using not only a Point-to-Multipoint (PMP) structure but also the mesh structure as shown in FIG. 1. The mesh mode allows access to a base station through relay of another subscriber end, thereby actively coping with non-line-of-sight communication environments in cities where radio-wave shadow areas are present due to large buildings or the like.

FIG. 2 illustrates an example of a frame structure in the mesh mode. As shown in FIG. 2, the mesh mode may construct control subframes and data subframes instead of using conventional frames. Control subframes provide the following basic functions. A combination of different systems is created and maintained with network control subframes. A function for equivalent scheduling in data communication between systems is performed with schedule control frames. All frames other than network control subframes that are generated at regular intervals are schedule control frames.

FIG. 3 is a flow chart of an example of a network access process of a mobile station in the case of PMP. As shown in FIG. 3, first, when a mobile station (MS) is powered on, the MS searches for a down channel and obtains up/down synchronization with a base station (BS) (S31). The MS then performs ranging with the BS to adjust uplink transmission parameters and the BS then allocates a basic management Connection ID (CID) and a primary management CID to the MS (S32). The MS and the BS perform negotiation of basic performance (S33) and perform an authentication process (S34). When the MS has been registered in the BS, the MS establishes an IP connection after the BS allocates a secondary management CID to the MS which is managed with an IP (S35). The MS then sets current date and time (S36) and downloads an MS configuration file from a server (S37) and then establishes a service connection (S38).

The following is a description of a procedure in which an MS registered in the network performs preprocessing procedures for handover. The preprocessing procedures for handover include a network topology advertisement procedure in which a serving BS broadcasts information regarding neighbor BSs to notify MSs of the information, a procedure for MSS scanning of neighbor BSs in which channel qualities of neighbor BSs are measured based on the information, and an association procedure in which the MS selectively performs, in advance, a ranging process with neighboring BSs, thereby allowing the MS to adjust uplink transmission power values, time and frequency difference values for synchronization, and the like, and to adjust parameters associated with uplink transmission, and to obtain, in advance, basic management CIDs, primary management CIDs, and the like from the BS.

Through the network topology advertisement procedure as described above, the BS transmits information regarding network configurations in the form broadcasting a BS advertisement message (MOB_NBR-ADV) to all MSs in the cell. Especially, the serving BS transmits, in advance, up and down channel parameters of neighbor BSs, thereby allowing the MS to rapidly obtain synchronization with a BS when performing handover to the BS and thus to reduce the time required to perform handover. The channel parameters include an Uplink Channel Descriptor (UCD) and a Downlink Channel Descriptor (DCD).

The MS must perform handover as needed. Thus, it is necessary to perform a process for scanning neighbor BSs. For scanning neighbor BSs, the MS transmits a scanning request message (MOB_SCN-REQ) to receive a scanning interval allocated by the BS. Through a scanning response message (MOB_SCN-RSP), the BS allocates an interval in which the MS can search for neighbor BSs. The BS may transmit a (unsolicited) scanning response message (MOB_CN-RSP) to the MS without request of the MS. Here, the BS may allocate the scanning interval and scanning start offset on a frame-by-frame basis.

In the association procedure, the MS performs, in advance, a ranging process with neighbor BSs as described above, thereby reducing the time required to perform handover. The ranging process is a process in which the MS obtains basic information for communication from the BS. The MS searches for neighbor BSs and selects an association target BS based on channel quality measurement results from the searched neighbor BSs. The MS then performs a ranging process with the BS to perform an association procedure.

In the association procedure, first, the MS transmits a ranging request message (RNG-REQ) or a Code Division Multiple Access (CDMA) code for ranging request. The BS sets power and timing offsets of the MS through a ranging response message (RNG-RSP). The BS also allocates a management CID to the MS through the ranging response message. After performing the association procedure with a specific MS, the BS stores association information of the MS.

The physical layer of the broadband wireless access system is classified into a single carrier type and a multicarrier type (OFDM/OFDMA). The multicarrier type uses Orthogonal Frequency Division Multiplexing (OFDM) and also uses Orthogonal Frequency Division Multiple Access (OFDMA) as an access method in which resources can be allocated in units of subscribers grouped using a part of the carrier.

FIG. 4 illustrates the concept of subchannels in the OFDMA physical layer Characteristics of the OFDMA physical layer in the broadband wireless access system are described as follows with reference to FIG. 4. In the OFDMA physical layer, an active carrier is separated into groups, which are transmitted to different receiving ends. The groups of the carrier for transmission to receiving ends are referred to as subchannels. FIG. 4 illustrates three subchannels including two subcarriers. Here, carriers included in each subchannel may be adjacent to each other or spaced at regular intervals. Allowing multiple accesses on a subchannel basis in this manner has advantages in that it is possible to efficiently perform frequency diversity gain control, gain control according to focusing of power, and forward power control.

FIG. 5 illustrates an example of a method for allocating resources in OFDMA. As shown in FIG. 5, a slot allocated to each MS is defined by a data region in two-dimensional space, which is a set of consecutive subchannels allocated by a burst. In FIG. 5, a data region in OFDMA is illustrated as a rectangle that is defined by a two-dimensional combination of the time and subchannel domains. The data region can be allocated to an uplink of a specific MS and information can be transmitted in downlink to the specific MS through the data region. The number of OFDM symbols in the time domain and the number of consecutive subchannels starting at a position that is spaced an offset from a reference point in the frequency domain must be given to define such data regions in two-dimensional space.

FIG. 6 illustrates an example of a method for mapping subchannels in uplink/downlink frames. As shown in FIG. 6, allocated subchannel areas are represented in two dimensions and data is mapped to the two-dimensional subchannel areas, starting from a subchannel of the foremost symbol. In the case of uplink, allocation areas of the allocated subchannel are first determined in one dimension. Specifically, a duration is determined and subchannel allocation is performed along the symbol axis, starting from a subchannel next to a subchannel that is previously allocated to another Protocol Data Unit (PDU) burst. When the last symbol of a specific subchannel is reached, the allocation is continued from the next subchannel.

FIG. 7 illustrates an example of a frame structure of the OFDMA physical layer of the broadband wireless access system. As shown in FIG. 7, a downlink subframe starts with a preamble used for synchronization and equalization in the physical layer. The overall frame structure is defined through downlink map (DL-MAP) and uplink map (UL-MAP) messages of broadcast format which define positions and usages of bursts allocated to the downlink and uplink.

Table 1 illustrates an example of the downlink map (DL-MAP) message.

TABLE 1

| Syntax | Size | Notes |
|---|---|---|
| DL-MAP_Message_Format( ) { | | |
| Management Message Type = 2 | 8 bits | |
| PHY Synchronization Field | variable | See appropriate PHY specification. |
| DCD Count | 8 bits | |
| Base Station ID | 48 bits | |
| Begin PHY Specific Section { | | See applicable PHY section. |
| for(i= 1; I <= n;i++) { | | For each DL-MAP element 1 to n. |
| DL-MAP_IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

Table 2 illustrates an example of the downlink map (DL-MAP) message.

TABLE 2

| Syntax | Size | Notes |
|---|---|---|
| UL-MAP_Message_Format( ) { | | |
| Management Message Type = | 8 bits | |

TABLE 2-continued

| Syntax | Size | Notes |
|---|---|---|
| 3 | | |
| UCD Count | 8 bits | |
| Allocation Start Time | 32 bits | |
| Begin PHY Specific Section { | | See applicable PHY section. |
| for(i= 1; I <= n; i++) { | | For each UL-MAP element 1 to n. |
| UL-MAP_IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

As described above, the DL-MAP message defines usages of bursts allocated to a downlink interval in the burst mode physical layer and the UL-MAP message defines the usages of bursts allocated to an uplink interval.

Table 3 illustrates an example of information elements (IEs) that constitute the DL-MAP.

TABLE 3

| Syntax | Size | Notes |
|---|---|---|
| DL-MAP_IE( ) { | | |
| DIUC | 4 bits | |
| if (DIUC == 15) { | | |
| Extended DIUC dependent IE | variable | See clauses following 8.4.5.3.1 |
| } else { | | |
| if (INC_CID == 1) { | | The DL-MAP starts with INC_CID = 0. INC_CID is toggled between 0 and 1 by the CID-SWITCH_IE( ) (8.4.5.3.7) |
| N_CID | 8 bits | Number of CIDs assigned for this IE |
| for (n=0; n< N_CID; n++) | | |
| { | | |
| CID | 16 bits | |
| } | | |
| } | | |
| OFDMA Symbol offset | 8 bits | |
| Subchannel offset | 6 bits | |
| Boosting | 3 bits | 000: normal (not boosted); 001: +6 dB; 010: −6 dB; 011: +9 dB; 100: +3 dB; 101: −3 dB; 110: −9 dB; 111: −12 dB; |
| No. OFDMA Symbols | 7 bits | |
| No. Subchannels | 6 bits | |
| Repetition Coding Indication | 2 bits | 0b00 - No repetition coding 0b01 - Repetition coding of 2 used 0b10 - Repetition coding of 4 used 0b11 - Repetition coding of 6 used |
| } | | |
| } | | |

As in the example of Table 3, IEs, which constitute the DL-MAP, include a Downlink Interval Usage Code (DIUC), a Connection ID (CID), and burst position information used to identify downlink traffic intervals for MSs. The burst position information includes a subchannel offset, a symbol offset, the number of subchannels, and the number of symbols.

Table 4 illustrates IEs that constitute the UL-MAP.

TABLE 4

| Syntax | Size | Notes |
|---|---|---|
| UL-MAP_IE( ) { | | |
| CID | 16 bits | |
| UIUC | 4 bits | |
| if (UIUC == 12) { | | |
| OFDMA Symbol offset | 8 bits | |
| Subchannel offset | 7 bits | |
| No. OFDMA Symbols | 7 bits | |
| No. Subchannels | 7 bits | |
| Ranging Method | 2 bits | 0b00 - Initial Ranging/Handover Ranging over two symbols 0b01 - Initial Ranging/Handover Ranging over four symbols 0b10 - BW Request/Periodic Ranging over one symbol 0b11 - BW Request/Periodic Ranging over three symbols |
| reserved | 1 bit | Shall be set to zero |
| } else if (UIUC == 14) { | | |
| CDMA_Allocation_IE( ) | 32 bits | |
| else if (UIUC == 15) { | | |
| Extended UIUC dependent IE | variable | See clauses following 8.4.5.4.3 |
| } else { | | |
| Duration | 10 bits | In OFDMA slots (see 8.4.3.1) |
| Repetition coding indication | 2 bits | 0b00 - No repetition coding 0b01 - Repetition coding of 2 used 0b10 - Repetition coding of 4 used 0b11 - Repetition coding of 6 used |
| } | | |
| Padding nibble, if needed | 4 bits | Completing to nearest byte, shall be set to 0. |
| } | | |

As in the example of Table 4, each information element (IE) of the UL-MAP message specifies the position of a corresponding interval by a duration field and specifies its usage by an Uplink Interval Usage Code (UIUC) for each Connection ID (CID). That is, the usages of the intervals of the UL-MAP message are defined by corresponding UIUCs used in the UL-MAP message. The interval of each UL-MAP IE starts at a position at a distance, corresponding to a duration defined in the UL-MAP IE, from the start of the previous IE. An uplink interval defined by "UIUC 12" is allocated to a usage for initial ranging, handover ranging, periodic ranging, or band request and has contention-based characteristics.

The following is a description of a ranging operation that is performed when an MS is initialized in a single carrier and OFDM method for the broadband wireless access system. A BS allocates a contention-based initial ranging interval to MSs through a UL-MAP message and each MS transmits a ranging request message including its MAC address using an uplink ranging interval. If the BS cannot decode a received ranging request message due to collision with another ranging request message transmitted from another MS, the BS transmits a ranging response message including uplink transmission parameter adjustment values and a ranging interval and a frame number that were used to receive the ranging request message.

If the BS can decode the received ranging request message, the BS transmits uplink transmission parameter adjustment values of the MS through a ranging response message. When adjustment of uplink transmission parameters of the MS is successfully performed, the BS transmits a ranging response message including a basic CID and a primary management CID to the MS. The BS allocates an uplink band through a UL-MAP message to allow the MS to transmit a ranging request message. Here, the BS allocates a non-contention-based uplink band through a basic management CID of the MS. When the uplink band has been allocated to the MS, the MS transmits a ranging request message and the BS transmits a ranging response message in response to the ranging request message. Here, the MS and the BS can perform their downlink burst coding and modulation method adjustment.

The following is a description of a ranging operation that is performed when an MS is initialized in an OFDMA method for the broadband wireless access system. In the OFDMA method for the broadband wireless access system, the MS can use a CDMA code for ranging request and uplink band request for adjustment of uplink transmission parameters. The BS transmits a set of CDMA codes for ranging and band requests to MSs through a UCD message in broadcast format. Each MS selects a ranging code suitable for the usage from the CDMA codes obtained from the UCD message and transmits it to the BS through an uplink interval allocated for ranging.

Table 5 illustrates an example of the UCD message.

TABLE 5

| Syntax | Size | Notes |
|---|---|---|
| UCD_Message_Format( ) { | | |
| Management Message Type = 0 | 8 bits | |
| Configuration Change Count | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded information for the overall channel | variable | TLV specific |
| Begin PHY Specific Section { | | See applicable PHY section. |
| for(i= 1; i <= n; i++) { | | For each uplink burst profile 1 to n. |
| Uplink_Burst_Profile | variable | PHY specific |
| } | | |
| } | | |
| } | | |

Table 6 illustrates an example of a TLV parameter associated with ranging and band requests included in the UCD message.

TABLE 6

| Name | Type (1 byte) | Length | Value |
|---|---|---|---|
| Initial ranging codes | 150 | 1 | Number of initial ranging CDMA codes. Possible values are 0-255.a |
| Periodic ranging codes | 151 | 1 | Number of periodic ranging CDMA codes. Possible values are 0-255.a |
| Handover ranging codes | ? | 1 | Number of handover ranging CDMA codes. Possible values are 0-255.a |
| Bandwidth request codes | 152 | 1 | Number of bandwidth request codes. Possible values are 0-255.a |
| Periodic ranging backoff start | 153 | 1 | Initial backoff window size for periodic ranging contention, expressed as a power of 2. Range: 0-15 (the highest order bits shall be unused and set to 0). |
| Periodic ranging backoff end | 154 | 1 | Final backoff window size for periodic ranging contention, expressed as a power of 2. Range: 0-15 (the highest order bits shall be unused and set to 0). |
| Start of ranging codes | 155 | 1 | Indicates the starting number, S, of the group of codes used for this uplink. All the ranging codes used on this uplink will |

TABLE 6-continued

| Name | Type (1 byte) | Length | Value |
|---|---|---|---|
| group | | | be between S and ((S + N + M + L + O) mod 256). Where, N is the number of initial-ranging codes. M is the number of periodic-ranging codes. L is the number of bandwidth-request codes. O is the number of initial-ranging codes. M is the number of handover-ranging codes. The range of values is 0 S ≦≦ 255 |

The BS allocates a contention-based ranging interval to MSs through an uplink map IE included in a UL-MAP message. Here, the contention-based ranging interval may be allocated while being divided into an initial ranging and handover ranging interval and a periodic ranging and band request interval according to the ranging usages.

When receiving a ranging code from the MS, the BS sets and transmits a ranging state (success or fail), adjusted time and frequency values, an adjusted transmission power value required for uplink transmission synchronization of the MS, and the like through a ranging response message (RNG-RSP).

Table 7 illustrates an example of the ranging response message (RNG-RSP).

TABLE 7

| Syntax | Size | Notes |
|---|---|---|
| RNG-RSP_Message_Format( ) { | | |
| Management Message Type = 5 | 8 bits | |
| Uplink Channel ID | 8 bits | |
| TLV Encoded Information | variable | TLV specific |
| } | | |

Table 8 illustrates an example of a TLV parameter included in a ranging response message.

TABLE 8

| Name | Type (1 byte) | Length | Value(variable-length) |
|---|---|---|---|
| Timing Adjust | 1 | 4 | Tx timing offset adjustment (signed 32-bit). The time required to advance SS transmission so frames arrive at the expected time instance at the BS. Units are PHY specific (see 10.3). |
| Power Level Adjust | 2 | 1 | Tx Power offset adjustment (signed 8-bit, 0.25 dB units) Specifies the relative change in transmission power level that the SS is to make in order that transmissions arrive at the BS at the desired power. When subchannelization is employed, The subscriber shall interpret the power offset adjustment as a required change to the transmitted power density. |
| Offset Frequency Adjust | 3 | 4 | Tx frequency offset adjustment (signed 32-bit, Hz units) Specifies the relative change in transmission frequency that the SS is to make in order to better match the BS. (This is fine-frequency adjustment within a channel, not reassignment to a different channel.) |
| Ranging Status | 4 | 1 | Used to indicate whether uplink messages are received within acceptable limits by BS. 1 = continue, 2 = abort, 3 = success, 4 = rerange |

TABLE 8-continued

| Name | Type (1 byte) | Length | Value(variable-length) |
|---|---|---|---|
| Ranging code attributes | 150 | 4 | Bits 31:22 - Used to indicate the OFDM time symbol reference that was used to transmit the ranging code. Bits 21:16 - Used to indicate the OFDMA subchannel reference that was used to transmit the ranging code. Bits 15:8 - Used to indicate the ranging code index that was sent by the SS. Bits 7:0 - The 8 least significant bits of the frame number of the OFDMA frame where the SS sent the ranging code. |

Table 9 illustrates an example of a TLV parameter included in a ranging response message.

TABLE 9

| Name | Type (1 byte) | Length | Value (variable-length) |
|---|---|---|---|
| Downlink Operational Burst Profile | 7 | 2 | This parameter is sent in response to the RNG-REQ Requested Downlink Burst Profile parameter. Byte 0: Specifies the least robust DIUC that may be used by the BS for transmissions to the SS. Byte 1: Configuration Change Count value of DCD defining the burst profile associated with DIUC. |
| SS MAC Address | 8 | 6 | SS MAC Address in MAC-48 format |
| Basic CID | 9 | 2 | Basic CID assigned by BS at initial access. |
| Primary Management CID | 10 | 2 | Primary Management CID assigned by BS at initial access. |

When it is determined that the uplink transmission parameter adjustment has been completed, the BS sets the ranging state to "success" and allocates an uplink band to the corresponding MS through an uplink IE (CDMA_Allocation_IE) to allow transmission of a ranging request message.

Table 10 illustrates an example of an uplink map IE used for allocating an uplink interval to the MS whose ranging is successful.

TABLE 10

| Syntax | Size | Notes |
|---|---|---|
| CDMA_Allocation_IE( ) { | | |
| Duration | 6 bits | |
| Repetition Coding Indication | 2 bits | 0b00 - No repetition coding 0b01 - Repetition coding of 2 used 0b10 - Repetition coding of 4 used 0b11 - Repetition coding of 6 used |
| Ranging Code | 8 bits | |
| Ranging Symbol | 8 bits | |
| Ranging subchannel | 7 bits | |
| BW request mandatory | 1 bit | 1 = yes, 0 = no |
| } | | |

When an uplink interval has been allocated to the MS, the MS transmits a ranging request (RNG-REQ) message including its ID (MAC address) to the BS. When receiving the ranging request message, the BS transmits a ranging response (RNG-RSP) message including a basic management CID and a primary management CID to the MS.

Table 11 illustrates an example of the ranging request message.

TABLE 11

| Syntax | Size | Notes |
| --- | --- | --- |
| RNG-REQ_Message_Format( ) { | | |
| Management Message Type = 4 | 8 bits | |
| Downlink Channel ID | 8 bits | |
| TLV Encoded Information | variable | TLV specific |
| } | | |

Table 12 illustrates an example of a TLV parameter included in a ranging request message.

TABLE 12

| Name | Type (1 byte) | Length | Value (variable-length) |
| --- | --- | --- | --- |
| Requested Downlink Burst Profile | 1 | 1 | Bits 0-3: DIUC of the downlink burst profile requested by the SS for downlink traffic. Bits 4-7: 4 LSB of Configuration Change Count value of DCD defining the burst profile associated with DIUC. |
| SS MAC Address | 2 | 6 | The MAC address of the SS |
| Ranging Anomalies | 3 | 1 | A parameter indicating a potential error condition detected by the SS during the ranging process. Setting the bit associated with a specific condition indicates that the condition exists at the SS. Bit #0 -SS already at maximum power. Bit # 1- SS already at minimum power. Bit #2 - Sum of commanded timing adjustments is too large. |
| AAS broadcast capability | 4 | 1 | 0 = SS can receive broadcast messages 1 = SS cannot receive broadcast messages |

Table 13 illustrates an example of a TLV parameter included in a ranging response message.

TABLE 13

| Name | Type (1 byte) | Length | Value (variable-length) |
| --- | --- | --- | --- |
| Downlink Operational Burst Profile | 7 | 2 | This parameter is sent in response to the RNG-REQ Requested Downlink Burst Profile parameter. Byte 0: Specifies the least robust DIUC that may be used by the BS for transmissions to the SS. Byte 1: Configuration Change Count value of DCD defining the burst profile associated with DIUC. |
| SS MAC Address | 8 | 6 | SS MAC Address in MAC-48 format |
| Basic CID | 9 | 2 | Basic CID assigned by BS at initial access. |
| Primary Management CID | 10 | 2 | Primary Management CID assigned by BS at initial access. |

As described above, the initial ranging is a process in which an MS transmits a ranging request to a BS through a contention-based uplink ranging interval when performing network registration and the BS provides a ranging response to the MS. When the MS performs ranging through a contention-based uplink interval, the MS may fail to receive a ranging response from the BS since it collides with another MS that performs ranging. If the MS fails to receive a ranging response message from the BS in a specific time after transmitting the ranging request message, the MS retransmits a ranging request to the BS.

The BS can allow a specific MS to perform non-contention-based ranging by allocating a ranging interval to the MS. When the MS performs handover to another BS while the MS is in normal operating state, the MS must perform ranging with the BS. Here, the serving BS may notify the handover target BS of the handover of the MS and the handover target BS may allocate a non-contention-based ranging interval which allows the MS to perform ranging when the MS actually performs handover.

Table 14 illustrates an example of an uplink map IE used to allocate a non-contention-based initial ranging interval.

TABLE 14

| Syntax | Size | Notes |
| --- | --- | --- |
| Fast_ranging_IE { | | |
| Extended UIUC | 4 bits | 0x06 |
| Length | 4 bits | Length = 0x0b |
| HO ID indicator | 1 bit | 0: MAC Address is present 1: HO ID is present |
| Reserved | 3 bits | Shall be set to zero |
| if (HO ID indicator == 1) { | | |
| HO ID | 8 bits | |
| Reserved | 40 bits | Shall be set to zero |
| } else { | | |
| MAC address | 48 bits | MS MAC address as provided on the RNG_REQ message on initial system entry |
| } | | |
| UIUC | 4 bits | UIUC ≠ 15. A four-bit code used to define the type of uplink access and the burst type associated with that access. |
| if (UIUC == 12) { | | |
| OFDMA Symbol offset | 8 bits | |
| Subchannel offset | 7 bits | |
| No. OFDMA Symbols | 7 bits | |
| No. Subchannels | 7 bits | |
| Ranging Method | 2 bits | 0b00 - Initial Ranging over two symbols 0b01 - Initial Ranging over four symbols 0b10 - BW Request/Periodic Ranging over one symbol 0b11 - BW Request/Periodic Ranging over three symbols |
| Reserved | 1 bit | Shall be set to zero |
| } else { | | |
| Duration | 10 bits | In OFDMA slots (see 8.4.3.1) |
| Repetition coding indication | 2 bits | 0b00 - No repetition coding 0b01 - Repetition coding of 2 used 0b10 - Repetition coding of 4 used 0b11 - Repetition coding of 6 used |
| Reserved | 20 bits | Shall be set to zero |
| } | | |
| } | | |

The above processes can be performed more efficiently using an RS. That is, use of the RS can increase the coverage and throughput of the BS. However, uplink resources are wasted in a communication system including a mobile RS if MSs in the RS coverage individually perform handover.

DISCLOSURE OF INVENTION

An object of the present invention devised to solve the problems lies on providing a handover control method using a relay station (RS) which allows MSs in the coverage of the RS to efficiently perform handover in a communication system including the RS.

BEST MODE FOR CARRYING OUT THE INVENTION

The above and other objects, features and other advantages of the present invention will be more clearly understood from the following detailed description taken in conjunction with the accompanying drawings. Reference will now be made in detail to the preferred embodiments of the present invention, examples of which are illustrated in the accompanying drawings.

Figure 1:
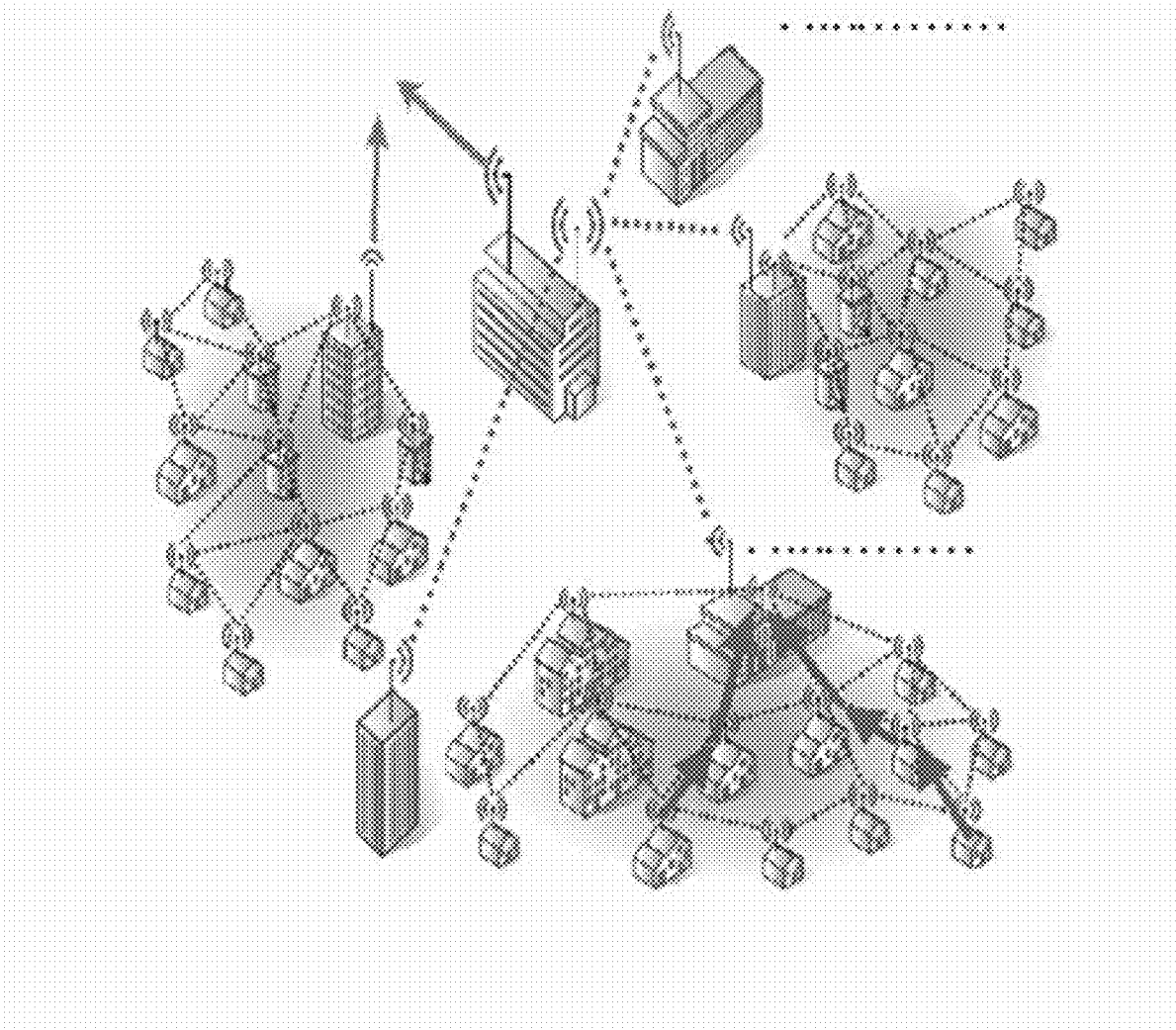
FIG. 1 illustrates an example of a mesh-structured communication network.
Figure 2:
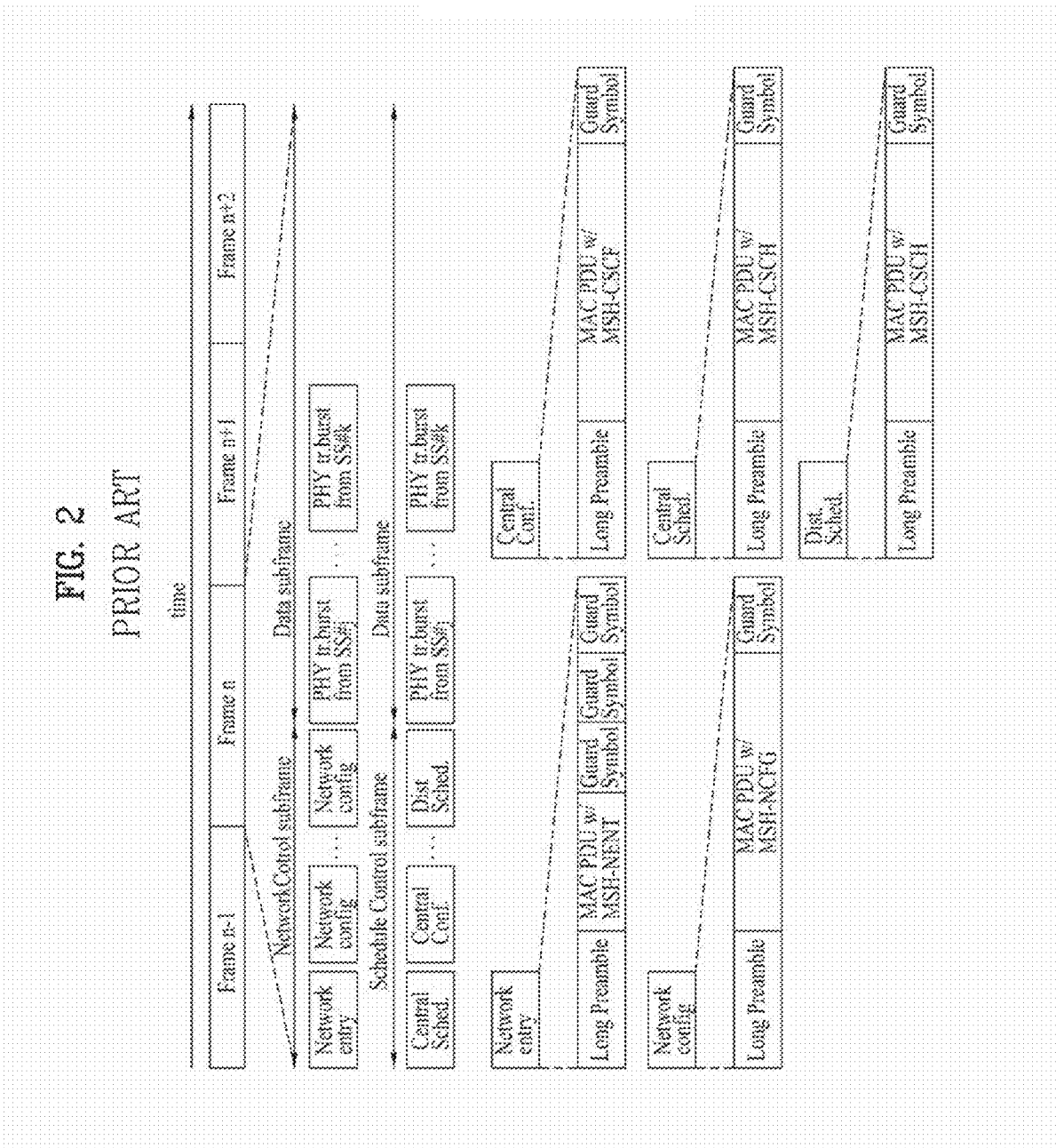
FIG. 2 illustrates an example of a frame structure in the mesh mode.
Figure 3:
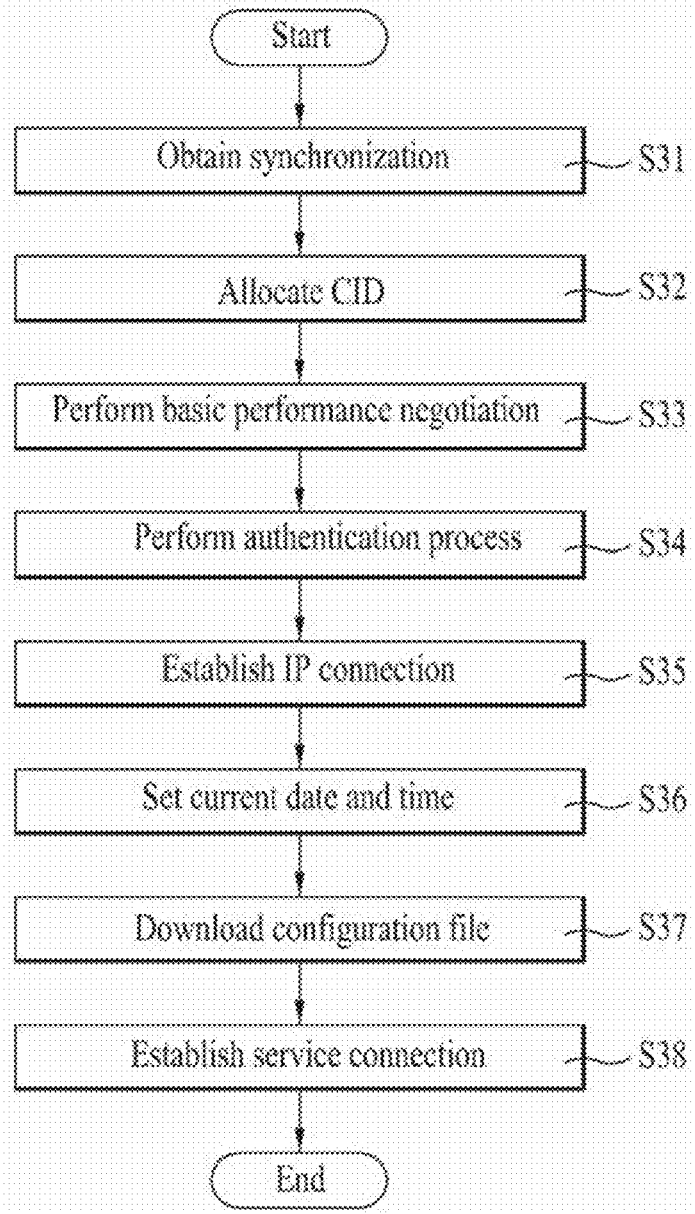
FIG. 3 is a flow chart of an example of a network access process of a mobile station in the case of PMP.
Figure 4:
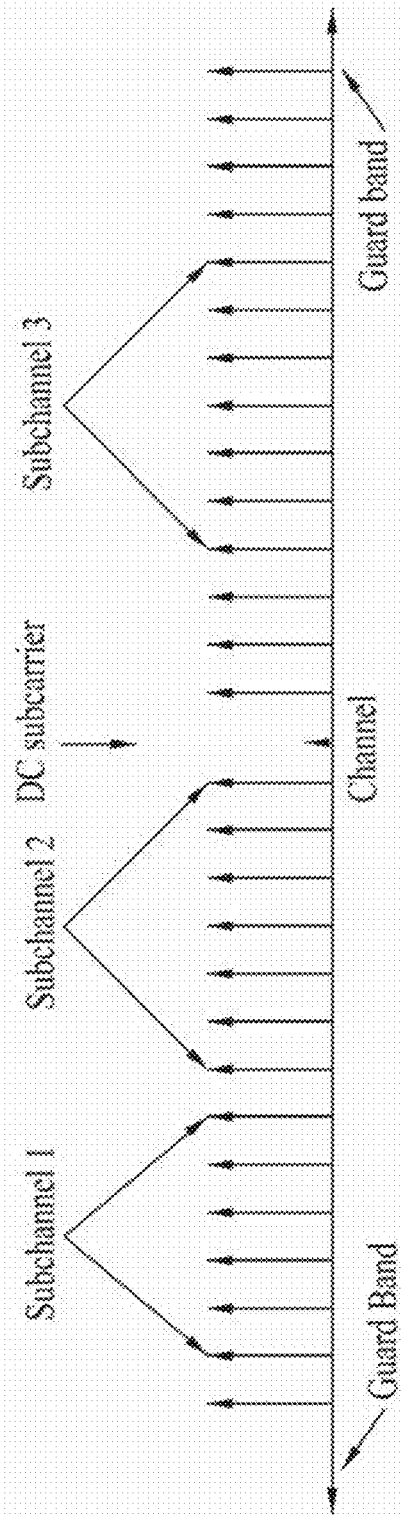
FIG. 4 illustrates the concept of subchannels in the OFDMA physical layer.
Figure 5:
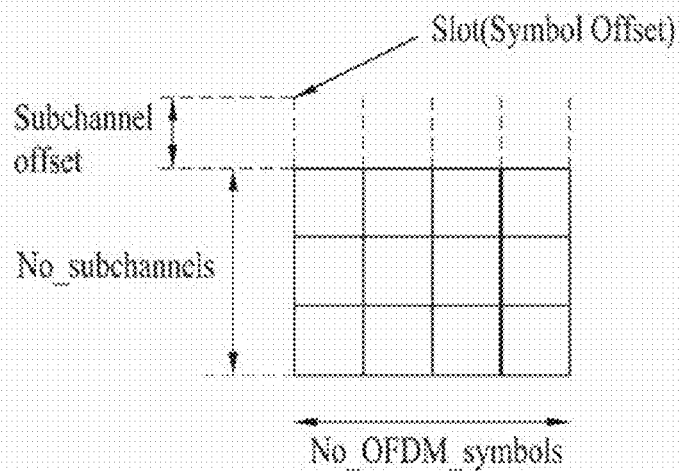
FIG. 5 illustrates an example of a method for allocating resources in OFDMA.
Figure 6:
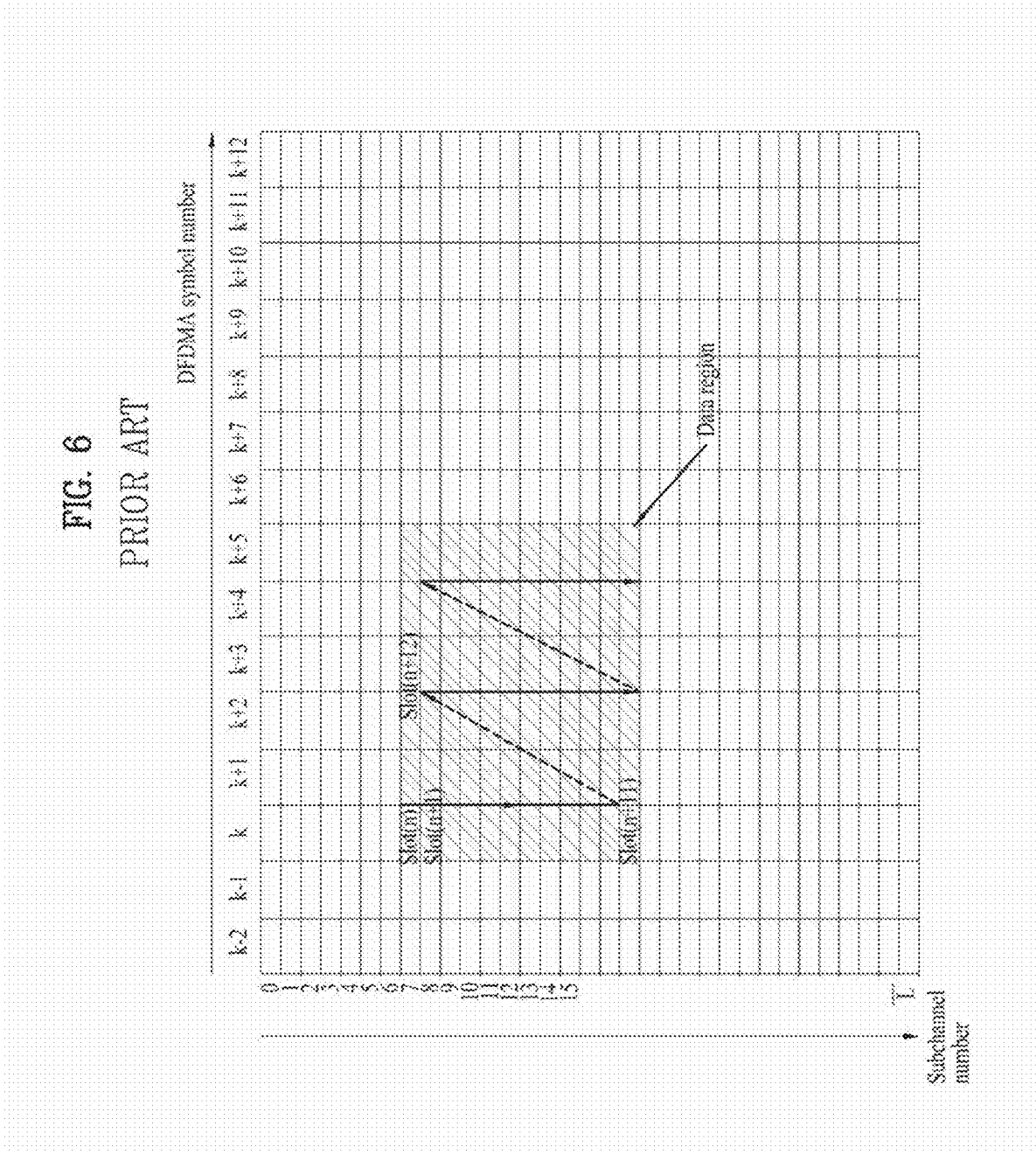
FIG. 6 illustrates an example of a method for mapping subchannels in uplink/downlink frames.
Figure 7:
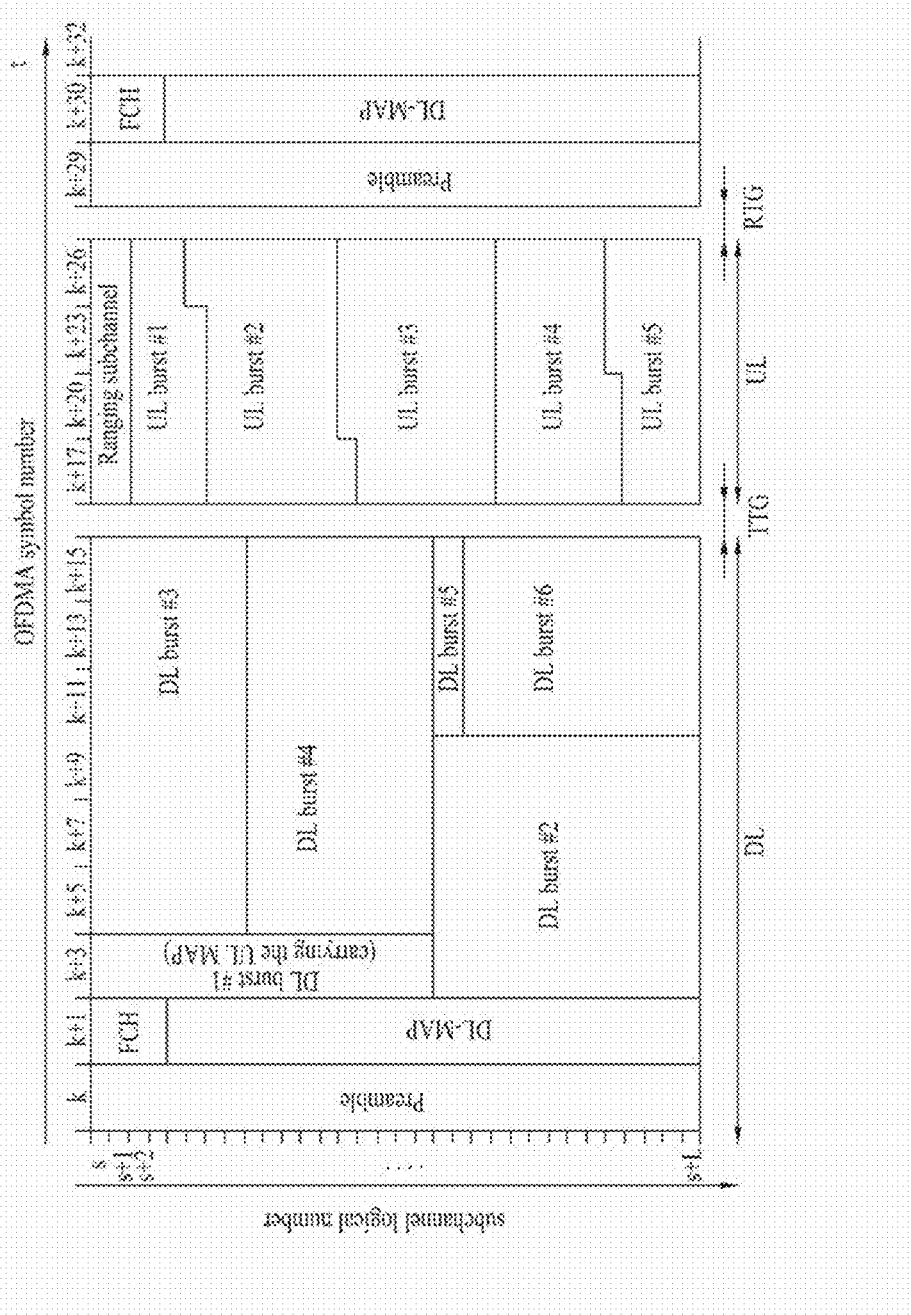
FIG. 7 illustrates an example of a frame structure of the OFDMA physical layer of a broadband wireless access system.
Figure 8:
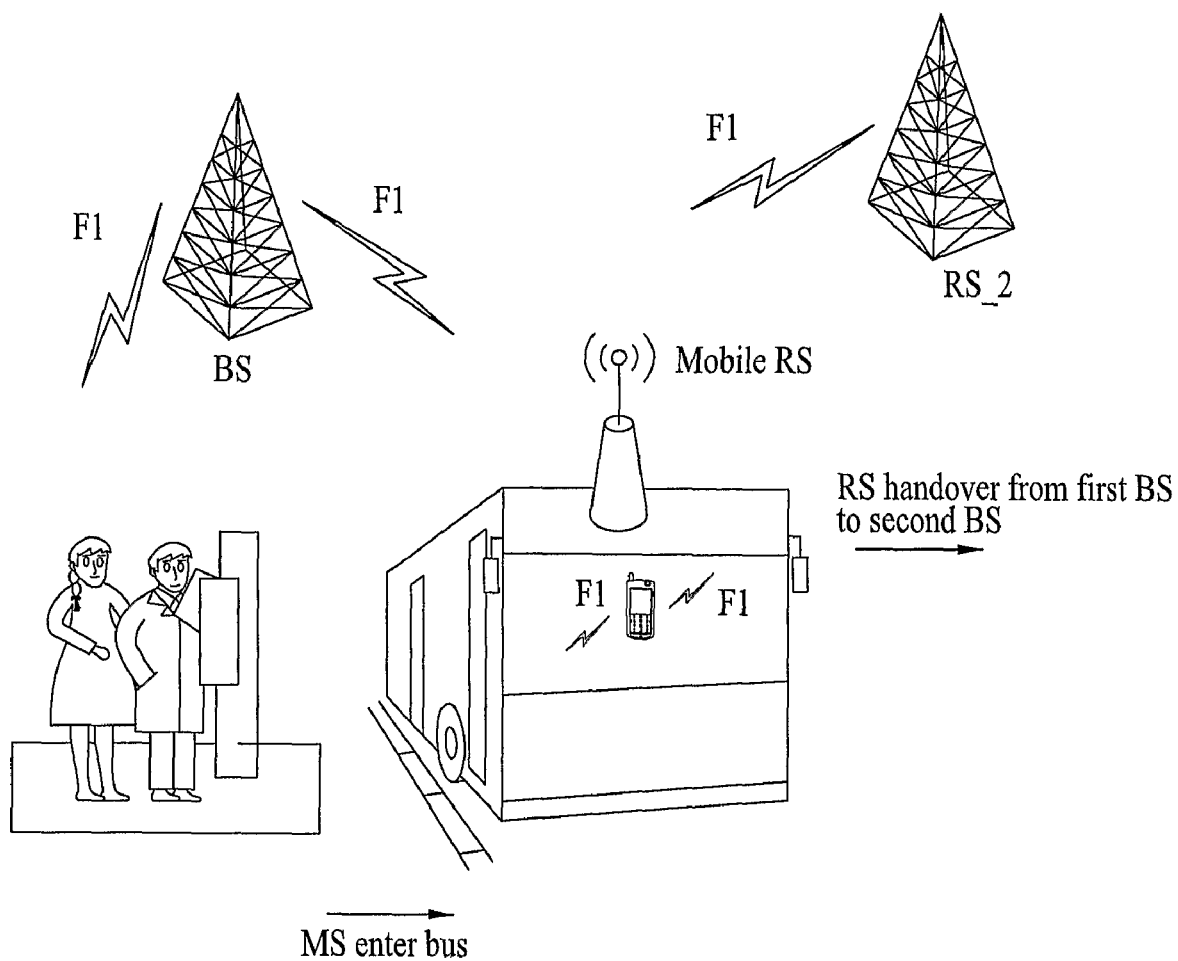
FIG. 8 illustrates an embodiment of the configuration of a communication system using a mobile Relay Station (RS).

FIG. 8 illustrates an embodiment of the configuration of a communication system using a mobile Relay Station (RS). As shown in FIG. 8, the service coverage and throughput of the system can be increased by installing an RS on mass transportation such as buses.

The following are example methods for the RS using frequency bands. In one method, the RS performs services using a new frequency band, regardless of a frequency band used by a base station (BS). In another method, the RS is assigned part of the frequency band used by the BS and performs services using the assigned frequency band. In another method, the RS may use the same frequency band as that of the BS and performs a service for amplifying and transmitting data or control signals received from the BS.

The following description will be given with reference to an example in which an agent RS is employed. The agent RS uses the same frequency band as that of the BS and amplifies and transmits data or control signals received from the BS. Since the agent RS does not perform processes for decoding a signal received from the BS and encoding the decoded signal, the agent RS does not cause frame delay that would occur when performing the encoding and decoding processes until the signal reaches a Mobile Station (MS) after being transmitted from the BS. Thus, the BS or MS does not need to know the presence of the RS. On the other hand, when the RS performs a handover or feedback process, the BS and the RS need to perform a different signaling procedure.

The following are example cases where the RS performs handover. In one case, the RS obtains basic connection IDs (CIDs) of MSs in the service coverage of the RS. In another case, the RS scans its neighbor BSs. In another case, the RS performs handover to a BS neighboring the RS.

In the above cases, first, the agent RS needs to detect the presence of any MS in the coverage of the agent RS. In one method, the RS detects the presence of an MS through a network entrance procedure. Here, the RS may obtain the information about the presence of the MS while monitoring signals communicated between the BS and the MS instead of the MS directly registering in the RS. On the other hand, the RS has a basic ID of the MS such as an initial ranging ID and a broadcast ID. The RS itself may have its ID. It is possible to obtain the ID of the RS through a network registration procedure like the MS and it is also possible to assign a unique ID to each RS.

Figure 9:
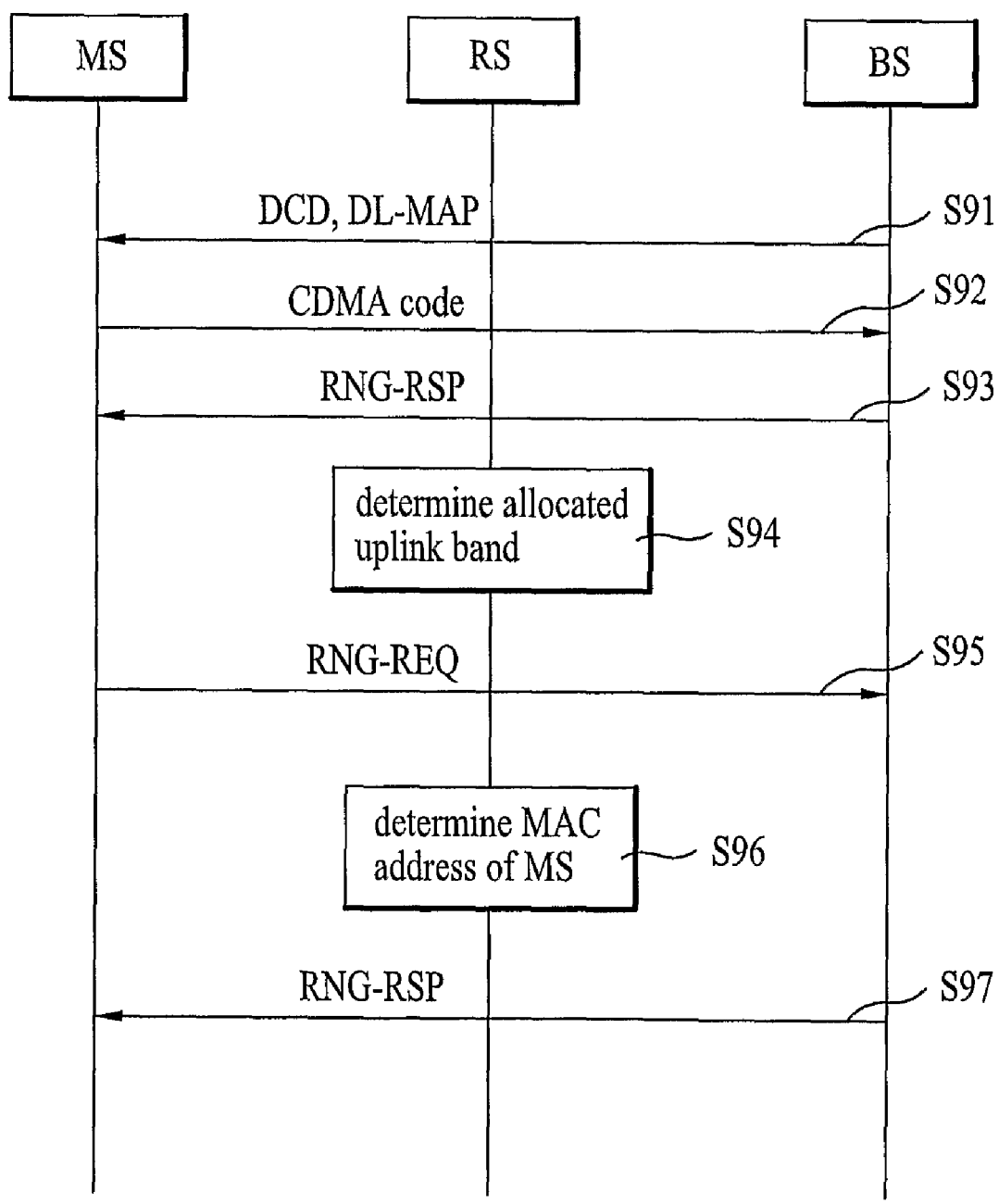
FIG. 9 is a flow diagram illustrating a method in which an MS in the coverage of a mobile RS obtains a CID and a MAC address.

FIG. 9 is a flow diagram illustrating a method in which an MS in the coverage of a mobile RS obtains a CID and a MAC address. The method of FIG. 9 is an example in the case where the physical layer of the broadband wireless access system is an OFDMA physical layer.

As shown in FIG. 9, a BS obtains synchronization with the MS and transmits a DCD and a DL-MAP message to the MS (S91). The MS transmits a CDMA code for initial ranging to the BS for uplink transmission parameter adjustment (S92). At this time, the CDMA code for initial ranging is transmitted to the BS through a contention-based initial ranging interval. If it is determined from the CDMA code transmission that there is no collision, the BS transmits a ranging response message (RNG-RSP) including an initial ranging success state and a CDMA allocation IE (S93).

Since the exchange of signals between the MS and the BS is performed through the RS, the RS can know an uplink band allocated to the MS through an uplink map IE (CDMA allocation IE) (S94). The MS transmits a ranging request message including a MAC address of the MS through the allocated uplink band (S95). Since the RS constantly monitors the uplink band allocated to the MS, the RS can also obtain the MAC address of the MS transmitted to the BS through the ranging request message (S96).

On the other hand, the RS can differentiate an MS present in the RS coverage from an MS outside the RS coverage. For example, in the case where the mobile RS includes a directional antenna, the RS can detect that the strength of signals communicated outside the coverage of the RS is greater than the strength of signals communicated inside the coverage and that signals communicated through the allocated IE zone are those of an MS present in the coverage. Since the RS obtains an MAC address of the MS which performs a procedure for initial registration in the BS, the RS can obtain a basis management CID and a primary management CID, which are transmitted in TLV format, in the ranging response message transmitted from the BS (S97).

Figure 10:
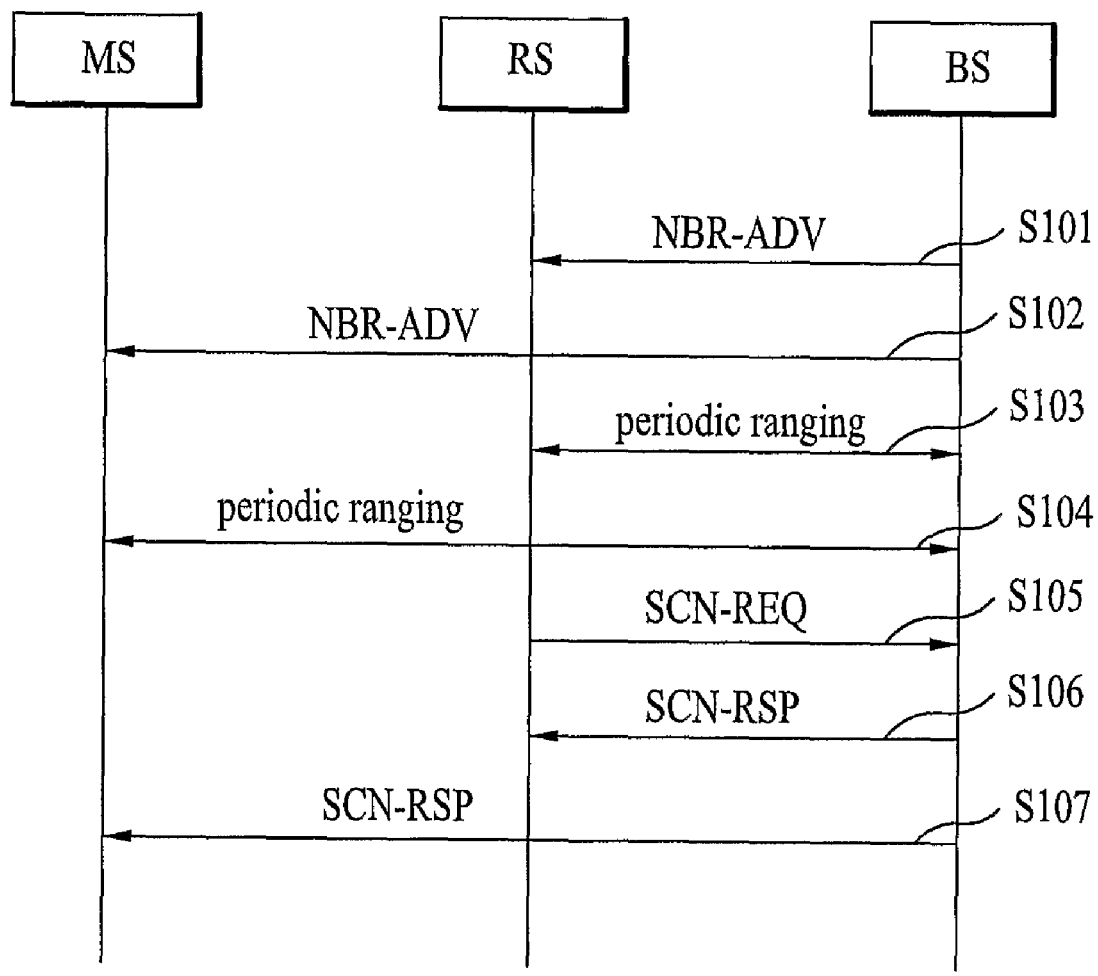
FIG. 10 is a flow diagram of an embodiment of a method for a mobile RS scanning its neighbor BSs.

FIG. 10 is a flow diagram of an embodiment of a method for a mobile RS scanning its neighbor BSs. As shown in FIG. 10, a first BS, which is a serving BS, transmits a neighbor BS advertisement message (NBR-ADV) in broadcast format. Accordingly, the MS and the RS receive the neighbor BS advertisement message (NBR-ADV) (S101, S102). The MS and the RS also perform periodic ranging processes (S103, S104). The RS transmits a scanning request message (SCN-REQ) including scanning interval (or period) information to the first BS (S105). Here, the RS can transmit the scanning request message together with a MAC address of the MS present in the RS coverage. The BS transmits a scanning response message (SCN-RSP) including a CID corresponding to the MAC address to the RS (S106). Since the RS is performing the scanning, the BS also transmits an (unsolicited) scanning response message to MSs in the RS coverage without request of the MS in order to avoid unnecessary MS scanning (S107). Accordingly, the MS does not perform scanning during a scanning interval of the RS defined in the scanning response message. However, when the signal strength is low, the MS can also transmit a scanning request message (SCN-REQ) to the BS.

Table 15 illustrates an example of the scanning response message (SCN-RSP).

TABLE 15

| Syntax | Size (bits) | Notes |
|---|---|---|
| MOB_SCN-RSP_Message_format( ) | | |
| Management Message Type = 55 | 8 | |
| Scan duration | 8 | In units of frames. When Scan Duration is set to zero, no scanning parameters are specified in the message. When MOB_SCN-RSP is sent in response to MOB_SCN-REQ, setting Scan Duration to zero denies MOB_SCN-REQ. |
| Scan Action | 8 | 0 = Yes scan action 1 = no scan action. MS don't scan during received scan duration |

If the MS requests periodic ranging while the RS performs scanning, the RS may stop the scanning and the MS may perform periodic ranging. In another embodiment, if downlink data to be transmitted from the BS to the MS is created while the RS performs scanning, the BS may store the data to be transmitted in a buffer and then transmit it after the scanning is terminated. In another embodiment, the RS may stop the scanning if the MS requests band allocation for uplink data transmission or transmits data.

Figure 11:
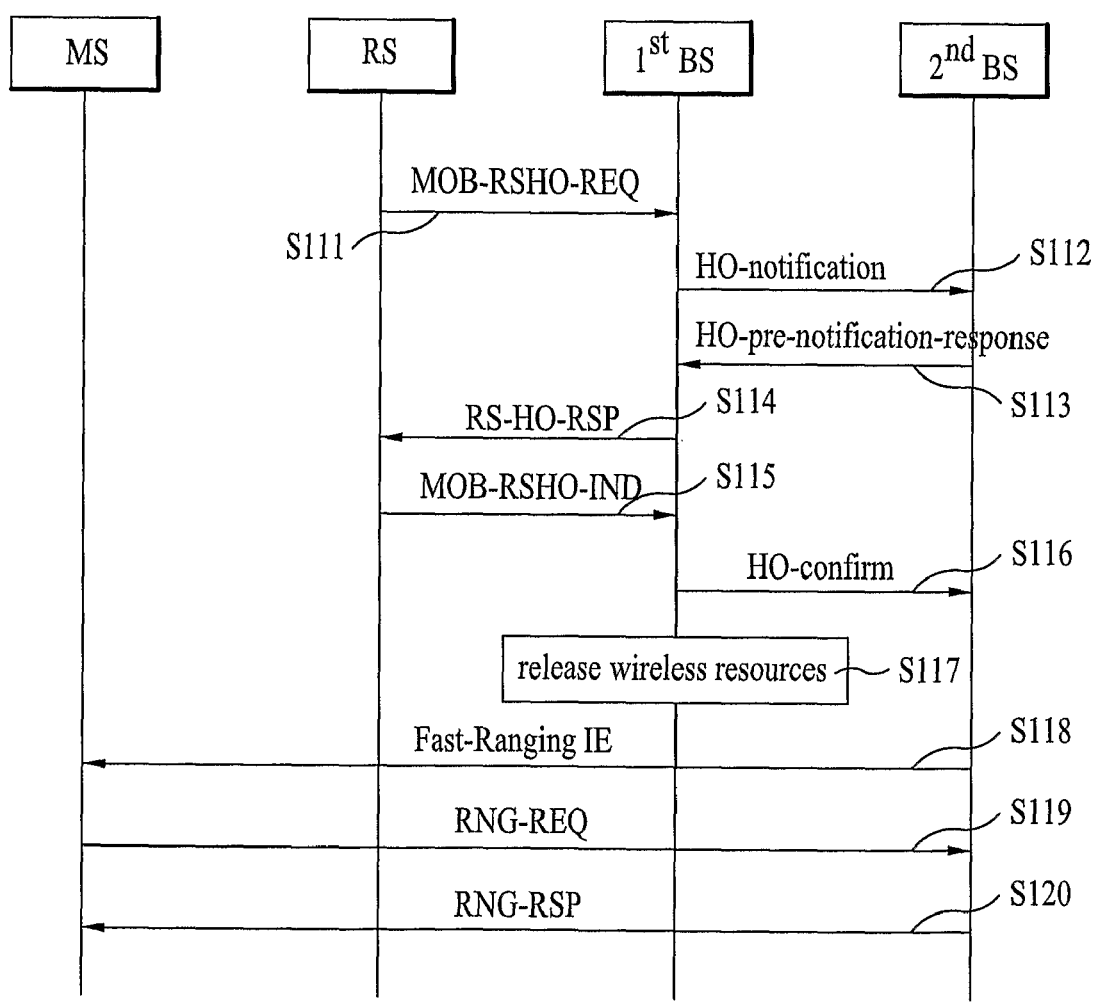
FIG. 11 is a flow diagram of an embodiment of a procedure for performing handover using a mobile RS.

FIG. 11 is a flow diagram of an embodiment of a procedure for performing handover using a mobile RS. As shown in FIG. 11, if it is determined from the scanning that handover is necessary, the RS transmits a handover request message (MOB-RSHO-REQ) to a first BS, which is the current serving BS (S111). Although the handover request message (MOB-RSHO-REQ) transmitted by the RS is similar to that transmitted by the MS, the handover request message (MOB-RSHO-REQ) transmitted by the RS is characterized in that it carries CIDs of all MSs in the RS coverage. On the other hand, if MAC addresses of all MSs in the RS coverage have been transmitted through the scanning request message, it is not necessary to transmit the CIDs of the MSs.

The first BS transmits a handover notification message (HO-pre-notification), including performance parameters, a desired Quality of Service (QoS) level, a requested frequency band, and a CID of each MS, to a second BS which is a handover target BS (S112). The second BS then transmits a handover notification response message (HO-pre-notification-response), including information of QoS levels that can be provided by the second BS, to the first BS (S113).

The first BS selects the second BS from BSs that have transmitted the handover notification message (HO-pre-notification). The first BS then transmits a handover response message (RS-HO-RSP) including the selected BS information to the RS (S114). The RS decides whether or not to perform handover and transmits the decision through a handover instruction message (MOB_RSHO-IND) (S115). When it is decided to perform handover, the first BS transmits information indicating that the RS will perform handover to the second BS through a handover confirmation message (HO-confirm) (S116) and then releases wireless resources established with the RS (S117).

The second BS allocates a non-contention-based uplink ranging interval to MSs in the RS coverage through a fast ranging information element (Rast-ranging IE) (S118). Each MS transmits a ranging request message (RNG-REQ) including a ranging target parameter and an ID of the first BS which is the previous serving BS to the second BS (S119). The second BS transmits a response message including a handover process optimization parameter regarding a process, which can be omitted when the MS performs network registration based on information of the MS received from the first BS, to the second BS (S120).

It will be apparent to those skilled in the art that various replacements, modifications, and variations can be made in the present invention without departing from the spirit or scope of the invention. Thus, the above embodiments and the accompanying drawings should not be construed as limiting the invention.

INDUSTRIAL APPLICABILITY

The present invention has an advantage in that it allows more efficient handover of mobile stations in the coverage of a Relay Station (RS) in a communication system including the RS.

What is claimed is:

1. A method for controlling handover using a Relay Station (RS) whose coverage area includes at least one mobile station, the method comprising:
    monitoring, via the RS, an uplink band allocated to a mobile station of the at least one mobile station;
    obtaining a Connection ID (CID) and a Medium Access Control (MAC) address of the mobile station;
    transmitting a scanning request message including the MAC address of the mobile station to a first base station;
    receiving a scanning response message including scanning timing and scanning interval information from the first base station;
    scanning neighbor base stations using the information included in the scanning response message;
    determining, based on the scanning, whether a handover is necessary;
    transmitting, via the RS, a handover request message including the CID and the MAC address to the first base station when it is determined that the handover is necessary; and
    receiving, from the first base station, a handover response message including information of a second base station recommended as a handover target base station,
    wherein the transmitted handover request message carries CIDs of all of the at least one mobile station in the RS coverage area when the at least one mobile station in the RS coverage area comprises more than one mobile station.

2. The method according to claim 1, further comprising:
    performing periodic ranging of the mobile station in the RS coverage area using the obtained CID and MAC address.

3. The method according to claim 2, further comprising:
    receiving, from the first base station, a neighbor base station advertisement message including neighbor base station information.

4. The method according to claim 3, further comprising:
receiving a periodic ranging request from the mobile station during the scanning;
discontinuing the scanning based on the receipt of the periodic ranging request; and
relaying periodic ranging of the mobile station based on the receipt of the periodic ranging request.

5. The method according to claim 3, further comprising:
receiving, from the mobile station, a band allocation request for uplink data transmission;
discontinuing the scanning based on the receipt of the band allocation request for uplink data transmission; and
relaying uplink data transmission of the mobile station based on the receipt of the band allocation request for uplink data transmission.

6. The method according to claim 1, wherein obtaining the CID and the MAC address of the mobile station comprises:
determining the uplink band allocated to the mobile station using a CDMA Code Division Multiple Access (CDMA) allocation information element relayed in an initial ranging process of the mobile station;
obtaining the MAC address of the mobile station using a ranging request message transmitted through the uplink band; and
obtaining the CID of the mobile station using a ranging response message corresponding to the ranging request message.

* * * * *